US008749577B2

(12) United States Patent
Shigeeda

(10) Patent No.: US 8,749,577 B2
(45) Date of Patent: Jun. 10, 2014

(54) INFORMATION PROCESSING APPARATUS, DATA PROCESSING METHOD, AND COMPUTER-READABLE RECORDING MEDIUM STORING PROGRAM

(75) Inventor: Nobuyuki Shigeeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 12/436,040

(22) Filed: May 5, 2009

(65) Prior Publication Data

US 2009/0278858 A1     Nov. 12, 2009

(30) Foreign Application Priority Data

May 12, 2008   (JP) .................................. 2008-124434

(51) Int. Cl.
  *G09G 5/00*        (2006.01)
(52) U.S. Cl.
  USPC .......................................................... 345/629
(58) Field of Classification Search
  CPC ..................... G06F 17/30265; G06F 17/30274;
    G06F 17/30554; G06F 17/30572; G06F
    17/30696; G06F 17/30699; G06F 17/30702;
    G06F 17/30716; G06F 17/30719; G06F
    17/30991; G06F 17/30994; G09G 2340/12;
    G06T 11/60
  USPC .......................... 345/629; 707/732, 733, 734
  See application file for complete search history.

(56) References Cited

U.S. PATENT DOCUMENTS

| | | | | |
|---|---|---|---|---|
| 6,285,999 B1 * | 9/2001 | Page ...................... | 707/999.005 |
| 7,216,123 B2 * | 5/2007 | Kamvar et al. ......... | 707/999.005 |
| 7,391,917 B2 | 6/2008 | Ohta et al. | |
| 2005/0193335 A1 * | 9/2005 | Dorai et al. .................... | 715/530 |
| 2005/0216434 A1 * | 9/2005 | Haveliwala et al. ............... | 707/1 |
| 2006/0047701 A1 * | 3/2006 | Maybury et al. ........... | 707/104.1 |
| 2007/0233671 A1 * | 10/2007 | Oztekin et al. ...................... | 707/5 |
| 2008/0209339 A1 * | 8/2008 | Macadaan et al. ............. | 715/745 |
| 2008/0209351 A1 * | 8/2008 | Macadaan et al. ............. | 715/762 |

FOREIGN PATENT DOCUMENTS

| | | | |
|---|---|---|---|
| JP | 2001-331723 | * | 11/2001 |
| JP | 2002-024208 A | | 1/2002 |
| JP | 2004-326490 A | | 11/2004 |
| JP | 2006-155381 A | | 6/2006 |
| JP | 2007-226769 A | | 9/2007 |

OTHER PUBLICATIONS

Kazuma Andoh, Analysis for Enterprise Portal Products, Nikkei Internet Solutions, vol. 68, No. 3, 2003, pp. 69-79, Japan.

* cited by examiner

*Primary Examiner* — Jeffery A Brier
(74) *Attorney, Agent, or Firm* — Canon U.S.A., Inc. IP Division

(57) ABSTRACT

In an information processing apparatus, object data based on a part of, e.g., a scan image is extracted and the extracted object data is stored in relation to attribute information of the relevant object data. The object data correlated to the attribute information, which matches with a search condition input by a user, is searched for, and the object data found through the search is merged to another object data depending on a characteristic of the user. The merged object data are displayed as a search result. In such a control process, different search results are displayed when users having different user characteristics input the same search condition.

18 Claims, 13 Drawing Sheets

FIG. 6A

| PREDEFINED IMAGE | MEANING ATTRIBUTE |
|---|---|
| IMAGE A | PARTS, CAR, AND TIRE |
| IMAGE B | COMPLETED PRODUCT AND CAR |
| IMAGE C | PARTS, COPYING MACHINE, AND FINISHER |
| IMAGE D | PARTS, CAMERA, AND LENS |

FIG. 6B

| USER MEANING ATTRIBUTE | CORRELATED USER CHARACTERISTIC |
|---|---|
| PARTS | ENGINEERING DESIGN |
| COMPLETED PRODUCT AND NEARBY TEXT | STYLING DESIGN |
| COMPLETED PRODUCT, NEARBY TEXT, AND SPECS | PLANNING |
| ENTIRE PAGE | GENERAL USER |

 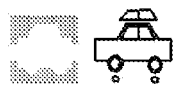

USER B

 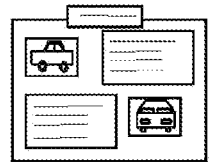

USER E

| ENGINEERING DESIGN DEPARTMENT | EXPLANATION OF PRODUCT |

| OTHER GENERAL | EXPLANATION OF DETAILS |

FIG. 14

STORAGE MEDIUM SUCH AS FD OR CD-ROM

| DIRECTORY INFORMATION |
|---|
| FIRST DATA PROCESSING PROGRAM<br>PROGRAM CODE GROUP CORRESPONDING TO<br>STEPS OF FLOWCHART ILLUSTRATED IN FIG. 10 |
| SECOND DATA PROCESSING PROGRAM<br>PROGRAM CODE GROUP CORRESPONDING TO<br>STEPS OF FLOWCHART ILLUSTRATED IN FIG. 11 |
| THIRD DATA PROCESSING PROGRAM<br>PROGRAM CODE GROUP CORRESPONDING TO<br>STEPS OF FLOWCHART ILLUSTRATED IN FIG. 12 |
| FOURTH DATA PROCESSING PROGRAM<br>PROGRAM CODE GROUP CORRESPONDING TO<br>STEPS OF FLOWCHART ILLUSTRATED IN FIG. 13 |
| |

INFORMATION PROCESSING APPARATUS, DATA PROCESSING METHOD, AND COMPUTER-READABLE RECORDING MEDIUM STORING PROGRAM

BACKGROUND OF THE INVENTION

1. Field of the Invention

The present invention relates to a technique for registering object data included in an image which is read from an original (document), and searching for a desired object in the registered object data.

2. Description of the Related Art

Hitherto, a technique for converting an input image to vector data has been practiced in a document processing system to facilitate reutilization of information that has been stored in the form of paper documents and image data (see Japanese Patent Laid-Open No. 2004-326490). With the technique disclosed in Japanese Patent Laid-Open No. 2004-326490, an image having been read by a scanner and stored is converted to vector data so that a file search can be performed and convenience in reutilization can be improved.

It is not always assured that any image having been read by a scanner and stored as vector data is convenient for a user to utilize data of the stored image. From this point of view, the technique disclosed in Japanese Patent Laid-Open No. 2004-326490 still has a room for improvement.

For example, when a catalogue explaining a new car is scan images read by the scanner include not only an image of the car itself, but also various kinds of information, such as explanation texts. After the scanning, when a user makes a search of the read car-catalogue images in preparing a new catalogue for another car, the input car-catalogue images including not only the image of the car itself, but also various kinds of information, such as explanation texts, are all searched.

In the above-described situation, if only the car image that is data as a part of the input catalogue images (i.e., object data) can be extracted by the search of the read car-catalogue image, the user can obtain image data in the form more convenient to reutilize the same. As another case, when the user prepares a document by utilizing the object data for a different purpose, the user may want to obtain combined information of both the car image and the explanation texts, for example, as the search result.

Stated another way, data that is optimum for the user making a search of the car catalogue images to utilize a part of those images again differs depending on the user's intention. Namely, of the input car-catalogue images, the user wants to obtain only the car image in some cases and the combined information of both the car image and the explanation texts in other cases.

SUMMARY OF THE INVENTION

An exemplary embodiment of the present invention provides a scheme enabling object data extracted from an input image, which is input by using a scanner or the like, to be reutilized with higher efficiency.

An information processing apparatus according to one aspect of the present invention is constituted as follows.

In an information processing apparatus configured to process an input image, the information processing apparatus includes an extracting unit configured to extract object data based on a part of the input image, a storage unit configured to store the object data extracted by the extracting unit and attribute information of the object data in relation to each other, a searching unit configured to search for the object data correlated to the attribute information that matches with a search condition input by a user, a merging unit configured to merge the object data found through the search by the searching unit to another object data based on a characteristic of the user, and a control unit configured to control to display, as a search result, the merged data into which a plurality of the object data are merged by the merging unit. The control unit controls to display different search results when users having different user characteristics input the same search condition.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIGS. 6A and 6B illustrate examples of a table of a meaning attribute map, which is referred to by a meaning attribute correlating portion illustrated in FIG. 4.

FIG. 14 illustrates a memory map in a storage medium storing various data processing programs, which are readable by the information processing apparatus according to the exemplary embodiment.

DESCRIPTION OF THE EMBODIMENTS

An exemplary embodiment of the present invention will be described below with reference to the drawings.

[System Configuration]

Figure 1:
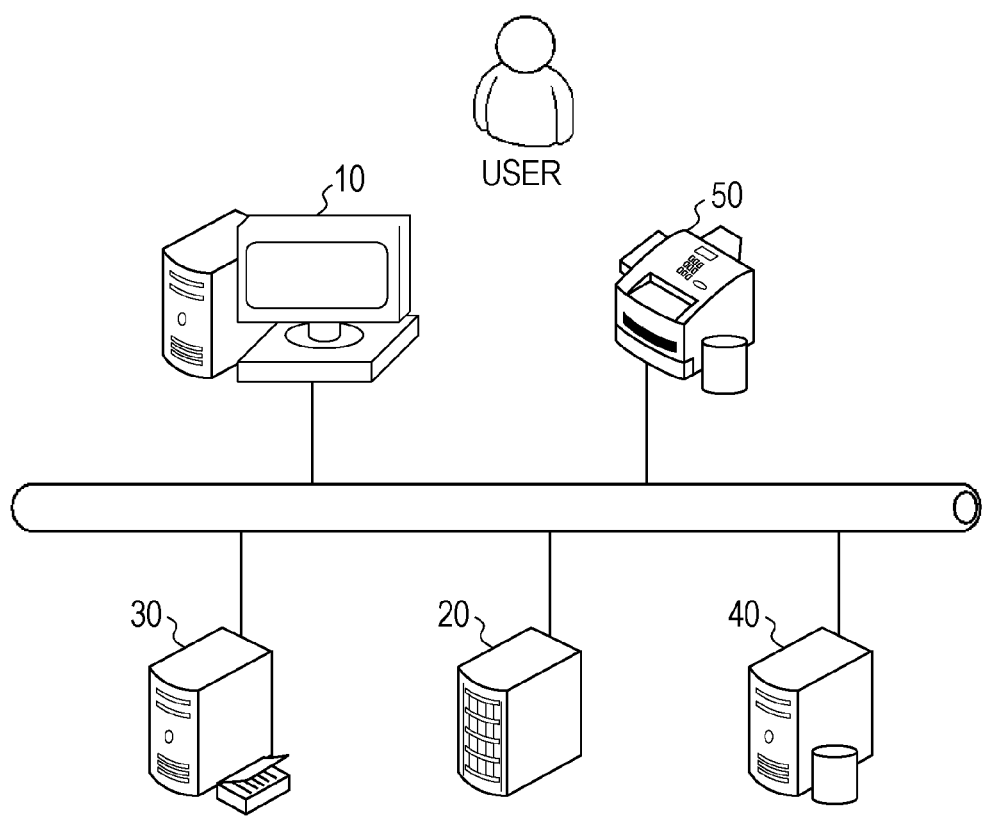
FIG. 1 is a conceptual diagram illustrating the configuration of a document management system, including an information processing apparatus, according to an exemplary embodiment of the present invention.

FIG. 1 is a conceptual diagram illustrating the configuration of a document management system, including an information processing apparatus, according to the exemplary embodiment.

Referring to FIG. 1, a user accesses the document management system through a browser installed in a client PC 10. A Web application server PC 20 provides a Web application for the document management system. A user management service server PC 30 manages information of a user who accesses the document management system. An object management service server PC 40 stores and manages object data.

Those devices constituting the document management system are interconnected via a network so that the devices can communicate with one another.

The user management service server PC 30 executes log-in authentication for the user to log in to the document management system. To that end, the user management service server PC 30 holds authentication information regarding the user and a user characteristic. As the user characteristic employed in this exemplary embodiment, the user management service server PC 30 further holds additional information, such as the organizational department (division) or the project to which the user belongs. The user characteristic includes, for example, information regarding the department to which the user belongs, and the role that is assigned to the user.

A multifunction device 50 has the function of scanning a paper document. More specifically, in generating image data with the scanning function, the multifunction device 50 can extract and store object data from among the generated image data. The object data is usually stored in a HDD that is incorporated in the multifunction device 50. Alternatively, the object data can also be applied to the object management service server PC 40 and stored therein. In this exemplary embodiment, the user can select which one of the HDD in the multifunction device 50 and the object management service server PC 40 is used to store the object data.

The object data stored in the HDD of the multifunction device 50 can also be referred to from the Web application server PC 20 which provides a document management function.

In other words, the user is not required to consider the place where the object data is stored, along with the object data stored in the object management service server PC 40.

While the Web application server PC 20, the user management service server PC 30, and the object management service server PC 40 are constituted separately from each other in this exemplary embodiment, those server PCs can also be constituted as one PC.

Further, a predetermined operating system is installed in each of the Web application server PC 20, the user management service server PC 30, and the object management service server PC 40 so that the server PC is able to perform data processing by executing an application stored in a hard disk, for example.

In addition, each of the Web application server PC 20, the user management service server PC 30, and the object management service server PC 40 has hardware resources, illustrated in FIG. 2, which are described later.

While the user operates the client PC 10 in this exemplary embodiment, the document management system can also be modified such that the user operates one of the above-described three server PCs or a PC which is equivalent to those three server PCs.

While, in the document management system according to this exemplary embodiment, the user accesses the document management system through the browser installed in the client PC 10, a dedicated client application (not shown) can also be installed in the client PC 10 such that the user operates the dedicated client application to access the document management system.

In such a case, instead of the Web application server PC 20, the dedicated client application can communicate with the user management service server PC 30.

[Hardware Configuration]

Figure 2:
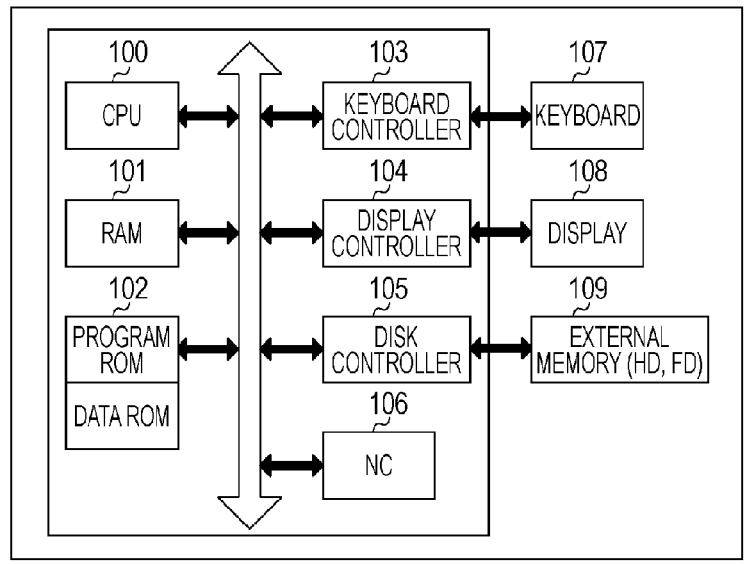
FIG. 2 is a block diagram illustrating the configuration of hardware of each of PCs, which constitute the document management system according to the exemplary embodiment.

FIG. 2 is a block diagram illustrating the configuration of hardware in each of the PCs, which constitute the document management system according to the exemplary embodiment. It is to be noted that the hardware configuration, illustrated in FIG. 2, corresponds to a block diagram representing the configuration of hardware in a general information processing apparatus. In other words, the hardware configuration of the general information processing apparatus can be similarly applied to each of the PCs in this exemplary embodiment.

Referring to FIG. 2, a CPU 100 executes programs, such as an OS and applications, which are stored in a program ROM within a ROM 102 or which are loaded into a RAM 101 from a hard disk 109. Herein, "OS" is an acronymic expression of an "Operating System" that runs on a computer. Hereinafter, the operating system will be referred to as the "OS". Processing of each of later-described flowcharts can be realized with execution of the programs.

The RAM 101 functions, for example, as a main memory and a work area for the CPU 100. A keyboard controller 103 controls a key input from a keyboard 107 or a pointing device (not shown). A display controller 104 controls various kinds of views presented on a display 108. A disk controller 105 controls data access to an external memory 109, such as a hard disk (HD) or a Flexible (registered trademark) disk (FD), which stores various data. A network controller (NC) 106 is connected to a network and executes a control process for communication with other apparatuses which are also connected to the network.

[Software Configuration]

Figure 3:
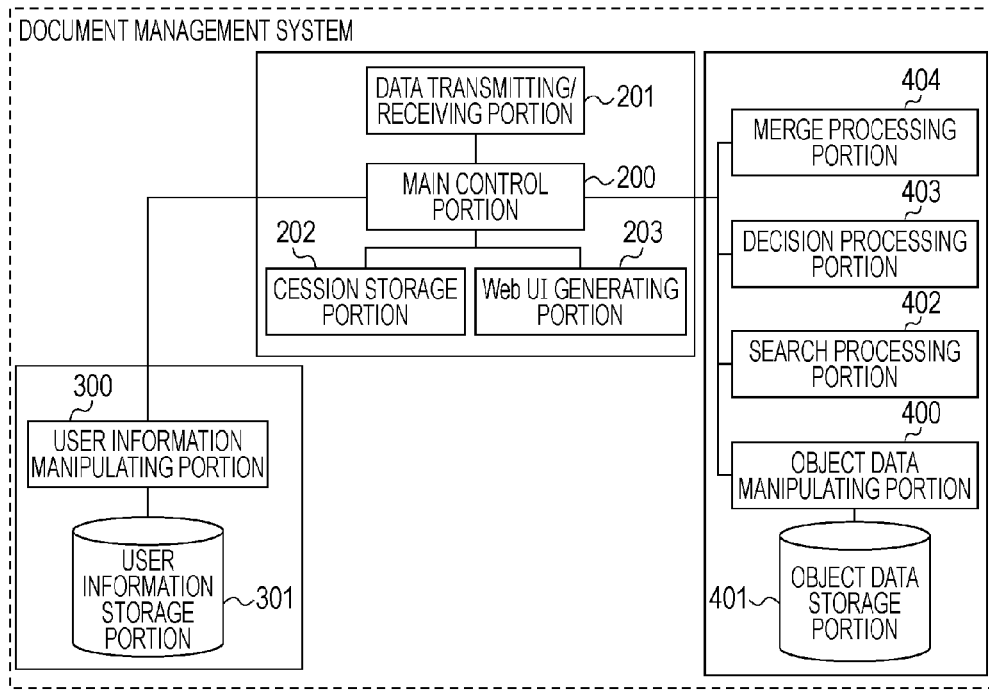
FIG. 3 is a block diagram illustrating the configuration of software in one example of the document management system according to the exemplary embodiment.
Figure 4:
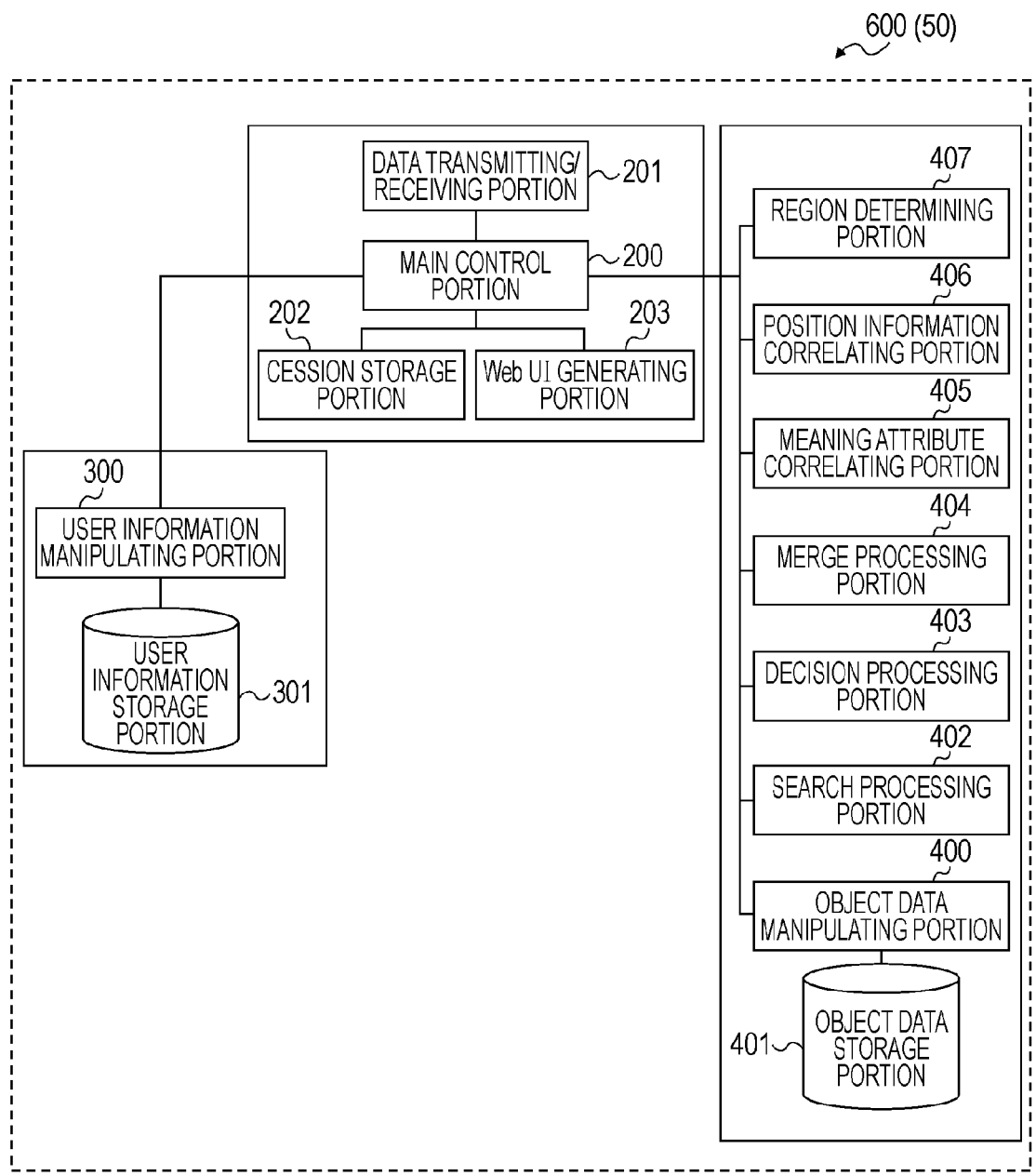
FIG. 4 is a block diagram illustrating the configuration of software in another example of the document management system according to the exemplary embodiment.

FIGS. 3 and 4 are each a block diagram illustrating the configuration of software in an example of the document management system according to the exemplary embodiment. More specifically, FIG. 3 illustrates the software configuration of the Web application server PC 20, the user management service server PC 30, and the object management service server PC 40 in FIG. 1. This example corresponds to the case that a document management system 500 includes the Web application server PC 20, the user management service server PC 30, and the object management service server PC 40, which are illustrated in FIG. 1.

Also, FIG. 4 illustrates the software configuration in the multifunction device 50 illustrated in FIG. 1. This example corresponds to the case that the multifunction device 50 illustrated in FIG. 1 includes components of a document management system 600 (i.e., of the multifunction device incorporated type).

Note that constituent elements indicated by rectangles in FIGS. 3 and 4 correspond to respective software components, and the layout of the software components depends on the system configuration and the platform.

Referring to FIG. 3, the document management system 500 includes all of software components which are disposed in the Web application server PC 20, the user management service server PC 30, and the object management service server PC 40 illustrated in FIG. 1.

In FIG. 3, a main control portion 200 controls the entirety of the document management system according to this exemplary embodiment and executes instructions to and management of other various portions described below.

A data transmitting/receiving portion 201 receives instructions generated from the client PC 10 by the user through the browser, and replies the results corresponding to the instructions to the client PC 10 from the main control portion 200.

A cession storage portion 202 generates cession information indicating that, after a user has accessed the document management system from the client PC 10 through the browser, the access is continued from the same user. Further, the cession storage portion 202 holds, in relation to the cession information, various kinds of repeatedly used information until the user stops the access to the document management system (i.e., logs out from the system), or until the cession is cut upon, e.g., automatic time-out.

A Web UI generating portion 203 generates a Web UI (HTML) corresponding to a situation upon receiving an instruction from the main control portion 200. It is to be herein noted that the Web UI generated by the Web UI generating portion 203 is not limited to the HTML and a script language, such as Java (registered trademark) Script, can also be buried therein.

A user information manipulating portion 300 executes, in accordance with instructions from the main control portion 200, such operations as obtaining and setting the names of users qualified to access the document management system 500 and the characteristics of those users, which are stored in a user information storage portion 301. User management is not limited to the management performed solely for the document management system 500. In other words, the user information manipulating portion 300 can also cooperate with another usual technique, e.g., Active Directory or LDAP, in such a manner that the user information storage portion 301 stores only the user characteristics.

An object data manipulating portion 400 executes, in accordance with instructions from the main control portion 200, such operations as registering, storing and updating the object data in an object data storage portion 401. In the object data storage portion 401, the object data, i.e., partial data extracted from data of an input image, is managed in correspondence to attribute information that is related to the relevant object data. The input image includes a scan image and an image handled in an image forming apparatus when the image is printed.

The object data storage portion 401 further holds index information corresponding to the attribute information of the object data. The index information is used in a search of the object data based on the attribute information. The object data storage portion 401 is controlled by the object data manipulating portion 400.

A search processing portion 402 executes search processing on the information stored in the object data storage portion 401. The search processing includes, for example, an attribute searching process executed on the attribute information set in relation to the object data. Further, the search processing includes a full-text searching process executed on text data contained in the attribute information of the object data, and a similar image searching process executed on the image data. The search processing portion 402 executes a composite search through control of those various types of searching processes. In addition, the search processing portion 402 executes management of the searching process, such as time-out of the searching process and interrupt of the searching process.

A decision processing portion 403 decides a user characteristic and a user meaning attribute that is defined in relation to the user characteristic, as illustrated in FIG. 6B. The user meaning attribute is decided at the time when the user logs in to the document management system or when the search processing is executed.

A merge processing portion 404 merges different types of object data, which have been found through a search, depending on the user meaning attribute. A merging process is executed depending on position information as well that is included in the object data.

The document management system 600 incorporated in the multifunction device 50, illustrated in FIG. 4, includes a meaning attribute correlating portion 405, a position information correlating portion 406, and a region determining portion 407 in addition to the above-described portions 200 to 203, 300 and 301. Those additional components will be described below. The multifunction device 50 of this example includes a scanner unit described later and also includes hardware resources for executing a process to extract an object included in image information having been read.

When the object data is extracted, the meaning attribute correlating portion 405 refers to a table illustrated in FIG. 6A and decides the meaning attribute corresponding to the relevant object data for assigning the meaning attribute thereto. A process of deciding and assigning the meaning attribute to the object data is executed by deciding one of predefined meaning attributes based on similarity to predefined images A to D, keywords, etc., which are defined in advance, in addition to determination regarding a type attribute included in the attribute information of the object data, and then assigning the decided meaning attribute to the relevant object data. Herein, the term "type attribute" implies the attribute indicating, for example, whether the object data is a text or an image.

Also, the term "meaning attribute" includes information indicating whether the object data extracted from the image data represents individual parts or a completed product. Further, the meaning attribute includes information indicating a more generalized category and a name of the predefined image, such as a "car" and a "tire" when the predefined image is, e.g., a car tire.

The position information correlating portion 406 detects position information in image data of the object data extracted from the image data and correlates the detected position information, as the attribute information, to the relevant object data.

The region determining portion 407 determines a region that can be cut out as the object data from the image data. The region determination is performed based on such elements as brightness information, color information, edge information, etc. of the image data.

[Use Cases and Search Result Screens]

FIGS. 5A to 5E illustrate the outline of document processing executed in the document management system according to the exemplary embodiment. Use cases in the document management system will be described below. In the following example, it is assumed that a user A 501 scans an image of an original document to extract object data and another user performs search processing for the extracted object data based on the user characteristic.

Figure 5A:
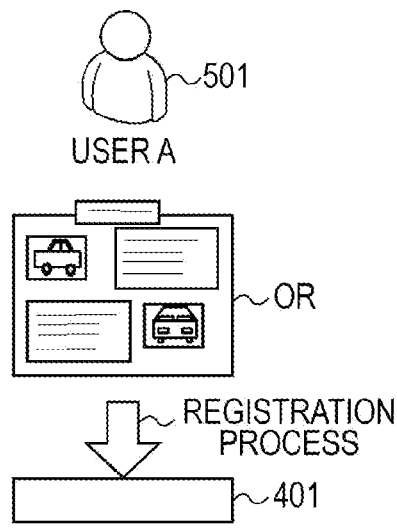
FIG. 5A illustrates the outline of document processing executed in the document management system according to the exemplary embodiment.
Figure 9:
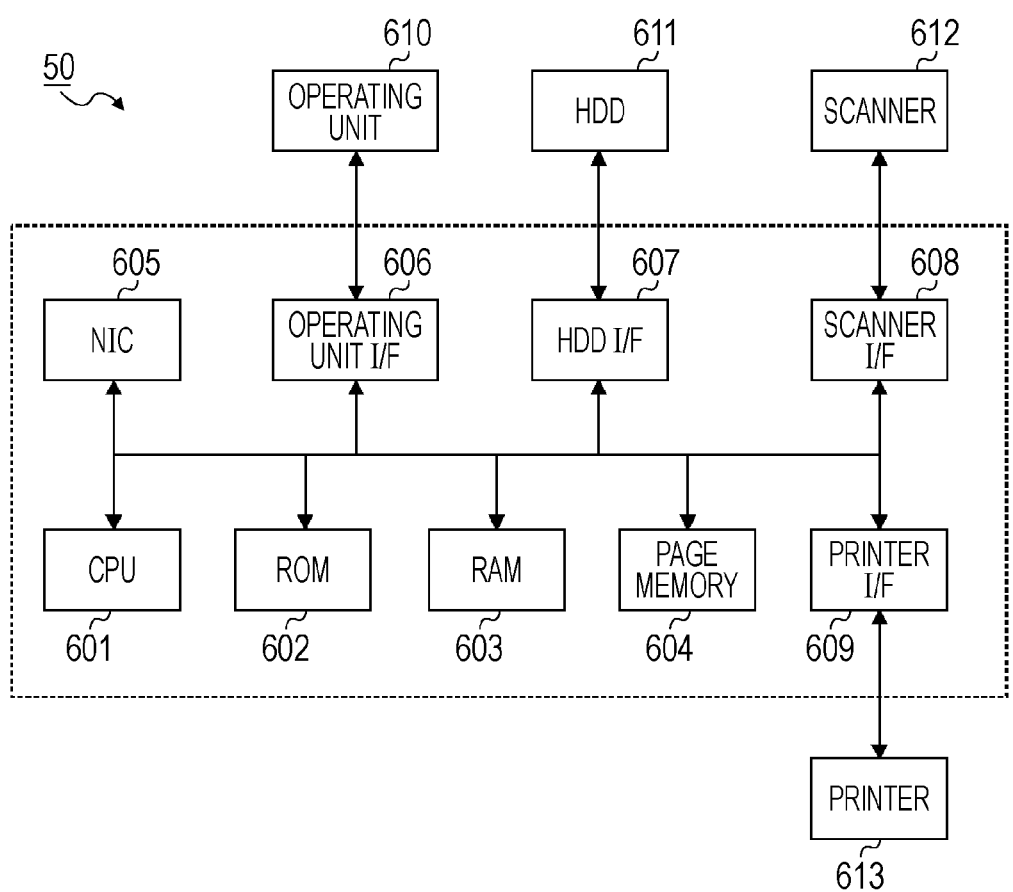
FIG. 9 is a block diagram illustrating the configuration of a multifunction device illustrated in FIG. 1.

In FIG. 5A, the user A 501 scans a car catalogue (OR: original document) on the multifunction device 50 and registers scan data in a storage area of the multifunction device 50 (i.e., a HDD 611 illustrated in FIG. 9). The multifunction device 50 includes the region determining portion 407, the position information correlating portion 406, and the meaning attribute correlating portion 405, which are illustrated in FIG. 4.

The scan data is subjected to region determination and is divided into plural sets of object data in the above-mentioned catalogue image. For a text object, text information obtained through an OCR process is correlated, as a part of the attribute information, to the text object. An image object is subjected to meaning attribute matching based on a table of a meaning attribute map illustrated in FIG. 6A such that the meaning attribute is assigned in relation to the object data. The table of the meaning attribute map, illustrated in FIG. 6A, is stored in the HDD 611 of the multifunction device 50. In this exemplary embodiment, the table of the meaning attribute map stores, per image, the meaning attributes assigned to a plurality of predefined images that represent features of the object data.

The object data and the attribute information correlated to the object data are stored in the object data storage portion 401 of the multifunction device 50 or the document management system 600.

A user B 502, a user C 504, a user D 506, and a user E 508 can individually establish connection with the document management system 500 to search and utilize information of cars for different purposes depending on respective departments to which the users belong.

Each user executes the search processing on the document management system 500 through a browser running on a PC that is employed by the user, and instructs the search processing for the information of cars based on the object data stored in, e.g., the document management system 600.

For example, the user B 502 belongs to an engineering design department and reutilizes images of parts, such as tires and wheels, from among car images in many cases. Assuming here that the user B 502 instructs a search by designating a "car" as the keyword, not only the user characteristic, but also the user meaning attribute are first decided by referring to a table of a user meaning attribute map illustrated in FIG. 6B (described later). Then, the search processing portion 402, etc. execute the search processing for the object data having been stored by the user A 501, taking into account the part that is specified in terms of the user meaning attribute. More specifically, the images of parts, such as a tire, a wheel, a body and a tail lamp of the car, are searched with higher priority while a reference is made to the predefined images illustrated in FIG. 6A.

Figure 5B:
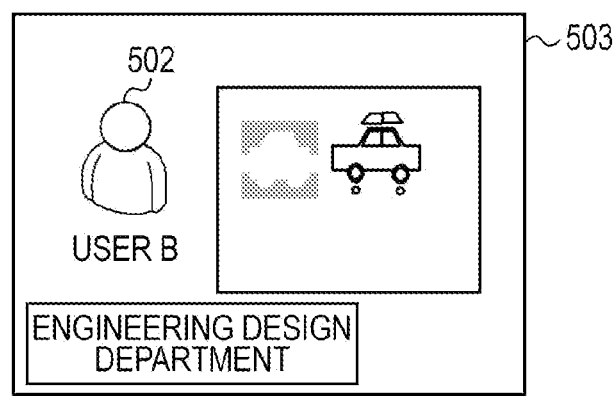
FIG. 5B illustrates the outline of document processing executed in the document management system according to the exemplary embodiment.

In this exemplary embodiment, as illustrated in FIG. 5B, a search result screen 503 is displayed for the user B 502 through the browser.

The user C 504 belongs to a styling design department and reutilizes images of entire cars and text objects regarding concepts of the cars in many cases. Also in a search made by the user C 504, not only the user characteristic, but also the user meaning attribute are decided by referring to the table of the user meaning attribute map illustrated in FIG. 6B (described later).

Figure 5C:
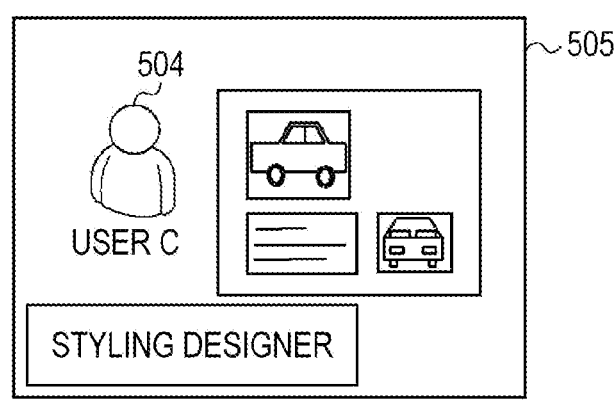
FIG. 5C illustrates the outline of document processing executed in the document management system according to the exemplary embodiment.

Assuming here that the user C 504 instructs a search by designating a "car" as the keyword, search results representing, in the merged form, an overall image and a rear image of the car, as well as text objects arranged nearby those images, are displayed with higher priority from among the object data having been stored by the user A 501. In this exemplary embodiment, as illustrated in FIG. 5C, a search result screen 505 is displayed for the user C 504 through a browser running on a PC that is employed by the user C 504.

The user D 506 belongs to a planning department and reutilizes images of entire cars and text objects regarding use of cars in many cases. Also in a search made by the user D 506, not only the user characteristic, but also the user meaning attribute are decided by referring to the table of the user meaning attribute map illustrated in FIG. 6B (described later).

Figure 5D:
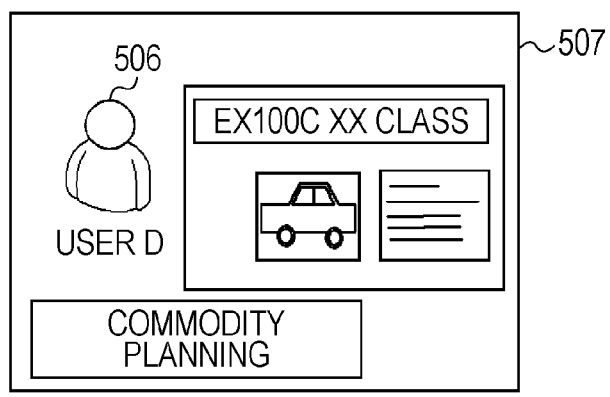
FIG. 5D illustrates an outline of document processing executed in the document management system according to the exemplary embodiment.

Assuming here that the user D 506 instructs a search by designating a "car" as the keyword, search results representing, in the merged form, an overall image of the car and a text object regarding specifications, are displayed with higher priority from among the object data having been stored by the user A 501. In this exemplary embodiment, as illustrated in FIG. 5D, search results are displayed, as an entire car, a nearby text, and specifications, for the user D 506 through a browser running on a PC that is employed by the user D 506.

A process of deciding the user characteristic and deciding the meaning attribute correspondingly for the user D 506, who is a styling designer, will be described in detail below.

When the user D 506, who is a styling designer, logs in, the user information is referred to and to which department the relevant user belongs is specified. Thus, by referring to the table of the user meaning attribute map illustrated in FIG. 6B (described later), the user characteristic is decided to be "styling design" and the user meaning attribute is also decided. Further, by similarly referring to the table of the meaning attribute map illustrated in FIG. 6A, the image of a completed product is searched. In addition, the nearby texts, the specifications, etc. are searched based on the user meaning attribute. As a result, a search result screen 507 is displayed for the user D 506, who is a styling designer, through the browser running on the PC that is employed by the user D 506.

Figure 5E:
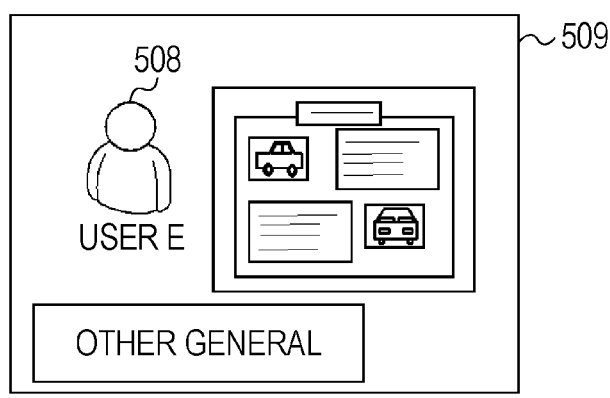
FIG. 5E illustrates an outline of document processing executed in the document management system according to the exemplary embodiment.

The user E 508 is one of other general users and reutilizes entire catalogues of cars in many cases. Also in a search made by the user E 508, not only the user characteristic, but also the user meaning attribute are decided by referring to the table of the user meaning attribute map illustrated in FIG. 6B (described later). Assuming here that the user E 508 instructs a search by designating a "car" as the keyword, all objects are merged together and an image of the entire catalogue is displayed based on the object data having been stored by the user A 501. In this exemplary embodiment, as illustrated in FIG. 5E, a search result screen 509 is displayed for the user E 508 through a browser running on a PC that is employed by the user E 508.

When car images have already been copied and scanned by other one or more users than the user A 501 to be stored in the object data storage portion 401, those object data are also displayed as the search results in a similar manner to the above-described use cases. Each user can select the desired object data from among the displayed results and can reutilize the selected object data, for example, when the relevant user prepares a document.

In this exemplary embodiment, the desired object data can be reutilized by dragging and dropping an image displayed as the search result to be pasted to a document as a reutilization target, or by selecting the image to be separately stored in a local folder. It is here assumed that the application and browser function of the PC employed by each user is able to execute dragging and dropping of a displayed image.

Additionally, when the user A 501 scans the car catalogue on the multifunction device 50 and registers the object data, the user A 501 can designate for each data whether reutilization of the data is allowed or not. This is intended to assure security of documents. In a search, only the data are hit which have been set allowable to reutilize at the time of extracting and storing the object data.

[Meaning Attribute Map]

FIGS. 6A and 6B illustrate examples of the table of the meaning attribute map, which is referred to by the meaning attribute correlating portion 405 illustrated in FIG. 4. The table of the meaning attribute map is stored, for example, in the object data storage portion 401 which functions as an "attribute information storage unit" and a "user meaning attribute storage unit".

More specifically, FIG. 6A illustrates the table of the meaning attribute map (Table I) with respect to an image object, which table is prepared upon registration of the object data and which is referred to by the meaning attribute correlating portion 405 illustrated in FIG. 4. This Table I is used to correlate the image object to the corresponding meaning attribute and includes various meaning attributes assigned respectively to a plurality of predefined images A to D. In this exemplary embodiment, those data are collectively called meaning attribute information.

For example, the meaning attribute, such as "parts, car, and tire", is mapped to an image of a car tire (e.g., the predefined image A in Table I illustrated in FIG. 6A). Also, the meaning attribute, such as "parts, copying machine, and finisher", is mapped to an image of a finisher of a copying machine (e.g., the predefined image C in Table I illustrated in FIG. 6A).

Referring to FIG. 4 again, for the object data extracted as the image object by the region determining portion 407, the meaning attribute correlating portion 405 compares the extracted object data with the predefined images A to D, which are previously defined as per Table I illustrated in FIG. 6A, to determine similarity between them. Then, the meaning attribute correlating portion 405 correlates the meaning attribute having a maximum similarity to the object data as the attribute information of the relevant image object.

Herein, the determination of the similarity is performed through usual algorithm calculations based on brightness information, color information, and edge information of the image. The series of calculation process and mapping process are executed by the meaning attribute correlating portion 405.

Table I illustrated in FIG. 6A is previously specified for general image objects and can be built in a product in a manner further extensible, as required, on the user definition basis.

FIG. 6B illustrates the table of the user meaning attribute map (Table II) used in a search of the object data. In Table II, preset user meaning attributes are mapped respectively to the user characteristics and hence to the image objects which are in turn correlated to the user characteristics.

For example, because the user belonging to the engineering design department as one of the user characteristics refers to image objects of parts in many cases, the user meaning attribute is previously assigned to "parts".

Also, if the user belongs to the planning department, the user reutilizes the image objects of completed products, instead of parts, in many cases. In addition, such a user refers to text objects nearby the completed products, particularly text objects regarding specifications. For those reasons, the user meaning attribute is previously defined as "completed product, nearby text, and specs".

The merge processing portion 404, illustrated in FIGS. 3 and 4, refers to the attribute information of each of plural object data, which have been hit in a search executed by the search processing portion 402, and then determines matching between the attribute information and the user meaning attribute defined in table II. The image object including, in the attribute information thereof, the attribute value defined in the user meaning attribute is merged, taking into account later-described position information of the image object as well.

Herein, the user meaning attribute is decided by the decision processing portion 403 illustrated in FIGS. 3 and 4. More specifically, one of the user meaning attributes mapped in Table II is decided based on the user characteristic that is identified when the user logs in the document management system 500 (or 600).

Further, the user characteristic is specified based on the information that is previously registered in the user information storage portion 301. While "engineering design", "styling design", "planning", and "general user" are registered as the user characteristics in the example illustrated in FIG. 6B, one or more other items can also be added as the user characteristics. In other words, individual items of the user characteristics can be mapped in Table II depending on environments of users who are going to utilize the object data.

For example, because the user B belongs to the engineering design department, as illustrated in FIG. 5B, the user B is identified, as a user in the engineering design department, within the document management system upon logging in to the system. As a result, the user meaning attribute of the user B is decided as "parts" in accordance with the mapping in Table II. Also, because the user D belongs to the planning department, the user meaning attribute of the user D is decided as "completed product, nearby text, and specs" upon logging in to the system.

Table II illustrated in FIG. 6B is previously specified for mapping between ordinary user characteristics and corresponding user meaning attributes and can be built in a product in a manner further extensible, as required, on the user definition basis. When the object data are to be reutilized as merged images, which are more specific to individual users, in the search and merge processing, user names can be designated as the user characteristics such that a meaning attribute using a proper noun is assigned as a user meaning attribute for each of the user names.

An extension example of Table II in which the object data is to be reutilized as a merged image specific to a user will be described below in connection with the case of a user X (not shown) who belongs to the car styling design department and who is engaged in designing car wheels.

The user X is designated as the user characteristic in Table II. Further, the user meaning attribute corresponding to that user characteristic is designated as "parts, car, tire, and wheel".

When the user X inputs "car" on an object search screen of the document management system 500 illustrated in FIG. 3, a plurality of tire images including wheel images merged thereto are displayed on the search result screen.

That search result is available only for the user X because the user X is designated as the user characteristic in Table II. When some other general user makes a search by designating "car", an image of a car catalogue is displayed on the search result screen. The reason is that the user meaning attribute of "entire page" is mapped to the user characteristic of "general user" in Table II.

The user meaning attribute in Table II, illustrated in FIG. 6, can also be provided by feeding back the meaning attribute of the object data, which has been actually selected and employed by the user from among the search results, and by automatically updating the map itself set in Table II.

In other words, the map is updated based on the past records so as to provide the meaning attribute more adapted for an actual user characteristic. Herein, the past records (including search history) contain, for example, an accumulated value of the number of times by which the user has actually selected particular object data, or a score (i.e., a numerical value representing a degree of matching) which is additionally input by the user when the user selects the object data.

As a modified embodiment, the map can also be updated such that the meaning attributes of the object data, which have been actually selected and employed by the user from among the search results, and the user characteristic of the relevant user are held in another table, and that Table II is updated depending on the frequency of use of each meaning attribute.

With such a modified embodiment, the user meaning attribute map (Table II illustrated in FIG. 6B) can be automatically updated and can be formed into a map with higher accuracy depending on the frequency of utilization of the system by each user.

When the object data is extracted in the multifunction device 50, the object data is often extracted in units of smaller objects which constitute respective parts.

Those smaller objects correspond, for example, to basic elements of figures, e.g., a circle, a line, and a rectangle, which define the shape of a car tire. The object data extracted as those basic elements of figures are too small as object units for reutilization and are often not assigned with the meaning attributes even when the meaning attribute map of Table I, illustrated in FIG. 6A, is applied to the object data.

Further, due to, e.g., stain or distortion of the original scanned by the multifunction device 50, the object data is extracted as a very complicated image object in some cases even though the extracted object data is not so small.

In one case, for example, in spite of the object data representing the figure of a car tire, the object data is extracted as a sector shape, instead of a circular shape, as a result of partial cutting.

In the document management system according to this exemplary embodiment, therefore, the following three extraction options can be previously set for an extraction process in consideration of the above-described case.

With setting of a first option, when any meaning attribute is not mapped to the object data, a preset general meaning attribute is automatically mapped to the relevant object data.

With setting of a second option, when any of the meaning attributes defined in Table I, illustrated in FIG. 6A, is not mapped to the object data, the relevant object is not extracted.

With setting of a third option, when any of the meaning attributes defined in Table I, illustrated in FIG. 6A, is not mapped to the object data, the meaning attribute having been mapped to another adjacent object data is diverted and mapped to the relevant object data.

In the case of the first option, the meaning attribute of the extracted image object is not included in the meaning attributes in Table I illustrated in FIG. 6A, and a general attribute, e.g., "figure element and circle" or "figure element and line", is mapped to the extracted image object. In this case, the above-mentioned attribute is actually not so effective as the meaning of the image object. Therefore, that image object has a low hit rate in searches and is accessed from users at a low rate. That type of object data can be treated such that, when another adjacent object data is referred, the relevant object data is merged to and displayed together with the referred object data.

In the case of the second option, only the objects defined in Table I, illustrated in FIG. 6A, are extracted. Therefore, the object data completely matching with the meaning attribute in Table I can be effectively reutilized, but the object data are not extracted in some cases.

In the case of the third option, the same meaning attribute as that mapped to another adjacent object data is mapped to the relevant object data. Therefore, even the object data that is not so frequently accessed can also be effectively reutilized.

While the third option is set as a default processing option in this exemplary embodiment, the application user can change the option setting depending on practical usage patterns.

[Manner of Designating Position Information and Meaning Attribute]

Figure 7:
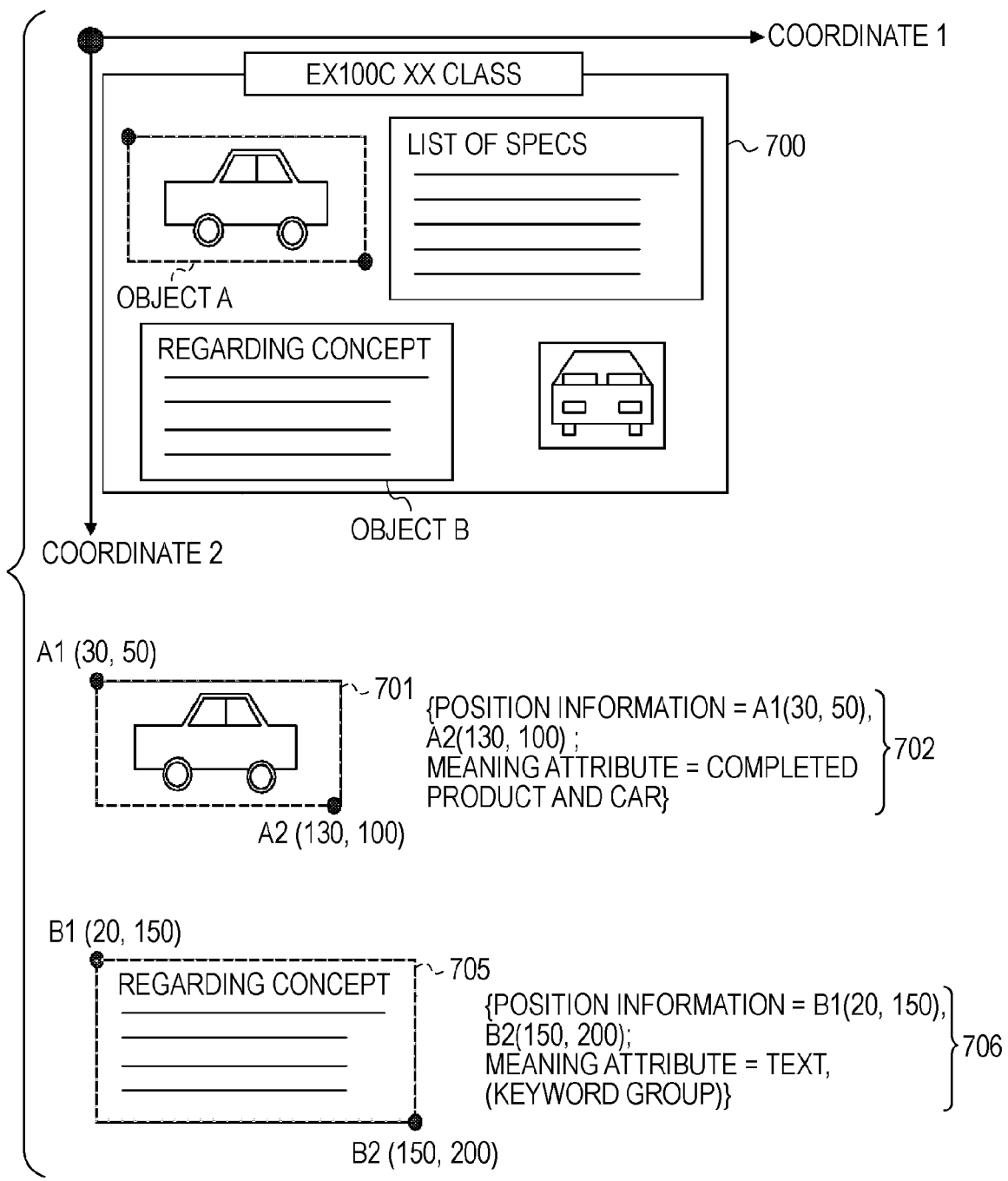
FIG. 7 illustrates a manner of designating position information and a meaning attribute in the document management system according to the exemplary embodiment.

FIG. 7 illustrates a manner of designating the position information and the meaning attribute in the document management system according to the exemplary embodiment. The manner of designating the position information and the meaning attribute will be described below.

Referring to FIG. 7, reference numeral 700 denotes an entire scan image. The region determining portion 407, illustrated in FIG. 4, determines and extracts objects which can be cut out from the entire scan image 700. Reference numeral 701 denotes a car image object (object A), and 705 denotes a text object (object B).

The position information correlating portion 406 recognizes coordinate data, which specifies the position and the size of each object, on the basis of the origin set at an upper left corner of the entire scan image 700, and then buries the coordinate data in attribute information of each object. As to the object A 701, the attribute information is designated in relation to object data 702.

For example, the position of the object A 701 is designated by coordinates A1 (30, 50), and the size of the object A 701 is designated by coordinates A2 (130, 100). Therefore, those coordinate values are buried in the attribute information. In other words, this exemplary embodiment is described in connection with an example in which the attribute information contains the position information of the object data in an input image.

The meaning attribute correlating portion 405 refers to the meaning attribute map (Table I illustrated in FIG. 6A) and buries "completed product and car" as the meaning attribute of the relevant object.

As to attribute information 706 of the object B 705, position information is handled in a similar manner. More specifically, coordinates B1 (20, 150) and coordinates B2 (150, 200) are buried as the attribute information of the object B 705.

However, because the object B 705 is not an image object, a different meaning attribute from that of the object A 701 is buried as the attribute information.

In determining the region of each object, the region determining portion 407, illustrated in FIG. 4, can additionally determine whether the cut-out object is an image or a text. Because the object B 705 is recognized as an image object of a text in the stage of determining the object region, text data in the relevant text object is buried as the meaning attribute. The text data can be extracted from the text object by employing the OCR process.

Thus, the text data is buried, as the meaning attribute, in the attribute information 706 of the object B 705. In addition, it is also possible to divide the text data into words and to bury those words as keywords.

Those keywords can be obtained from the text data by using a usual morphological analysis algorithm. The keywords can also be utilized as index information in a search for the object B 705. In practice, for example, "car" is often set as the keyword for a text included in a car catalogue.

[Search and Display Processing]

Figure 8:
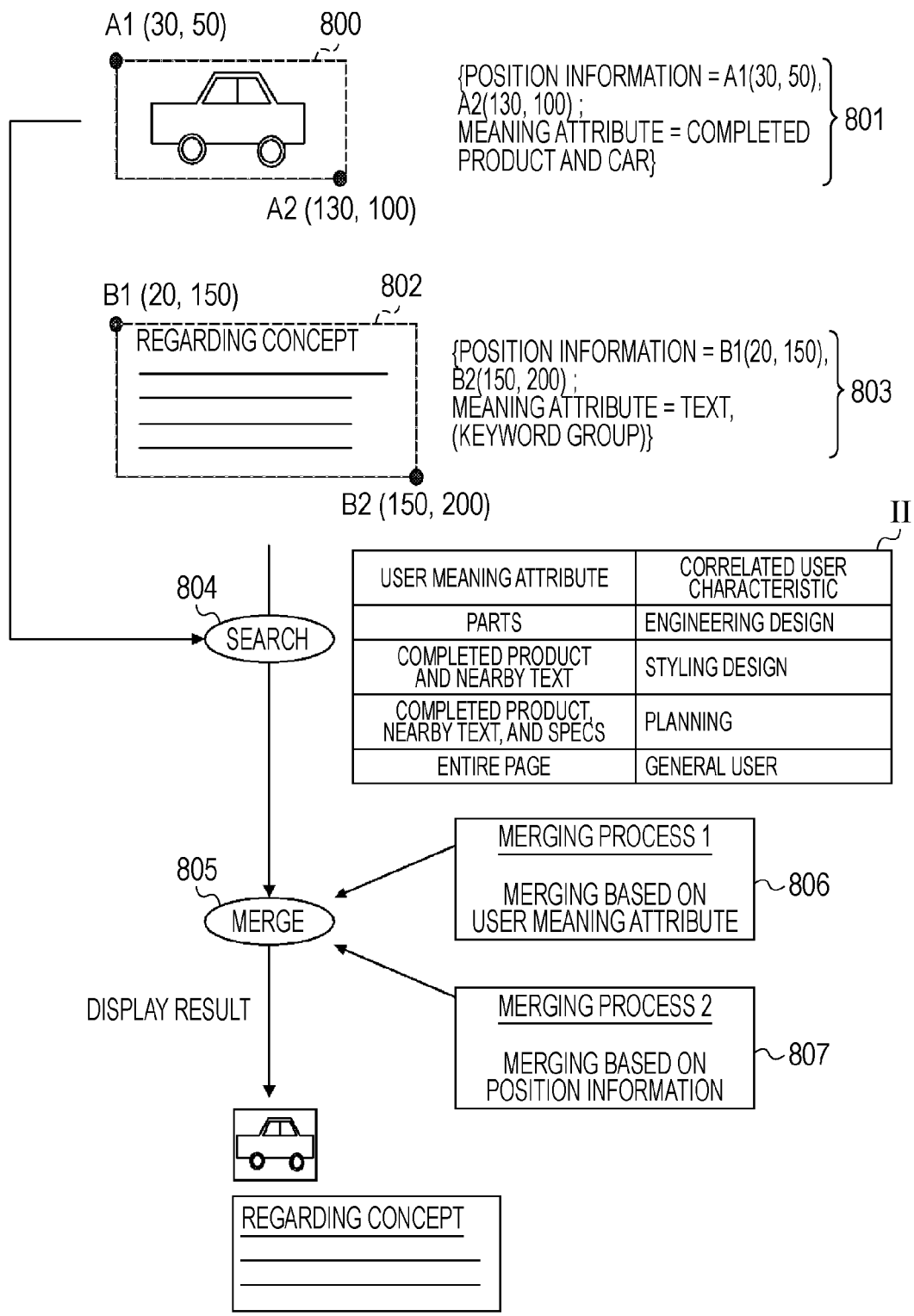
FIG. 8 illustrates the concept of search and merge processing executed in the document management system according to the exemplary embodiment.

FIG. 8 illustrates the concept of search and merge (display) processing executed in the document management system 500 according to the exemplary embodiment. The search and display processing will be described below.

Referring to FIG. 8, reference numeral 800 denotes an extracted image object which is held as object data in relation to attribute information 801. Reference numeral 802 denotes an extracted text object which is held as object data in relation to attribute information 803. Those object data are stored in the object data storage portion 401 illustrated in FIG. 3 or 4.

In FIG. 8, reference numeral 804 denotes search processing. In the search processing, the object data stored in the object data storage portion 401 are searched by using, as a key, a query (search condition) input by the user. The search processing is executed by the search processing portion 402 illustrated in FIG. 3 or 4.

In FIG. 8, reference numeral 805 denotes merge processing of object data. The merge processing includes two sub-sequences. One sub-sequence is a merging process 806 based on the user meaning attribute (i.e., a merging process 1), and the other sub-sequence is a merging process 807 based on the position information (i.e., a merging process 2). Any of the merging processes is executed by the merge processing portion 404 illustrated in FIG. 3 or 4. Further, in the merging process 2, a process of determining the position information is executed by using a first reference value and a second reference value as reference values indicating proximity. Note that the first reference value and the second reference value satisfy the relationship of (first reference value<second reference value).

In FIG. 8, reference numeral 808 denotes an image obtained by merging two sets of object data together depending on the user characteristic and displaying the merged object data. Those two sets of object data are hit in the search using "car" as the keyword and are subjected to the merge processing depending on the user characteristic to be displayed as one image object, as indicated by 808.

The merging process 2 represents the merge based on the position information, as indicated by 807, and is executed by determining, based on the proximity between different objects, whether those objects are to be merged together.

More specifically, the objects which have been determined to be merged together in the merging process 1 based on the user meaning attribute are actually merged if those objects are positioned close to each other. However, those objects are not merged if they are positioned away from each other. The reason is that if the objects are positioned away from each other, a degree of correlation between those objects is low with a relatively high probability.

[Object Data Extraction and Registration Flow]

FIG. 9 is a block diagram illustrating the configuration of the multifunction device 50 illustrated in FIG. 1.

Referring to FIG. 9, an operating unit 610 is connected to an internal bus through an operating unit interface (I/F) 606. The operating unit 610 includes an image display portion and a key input portion and receives an operating instruction from the user. Further, the operating unit 610 has the function of displaying information of the multifunction device 50 to the user. A HDD 611 stores input/output data and images.

A scanner 612 is connected to the internal bus through a scanner interface (I/F) 608. The scanner 612 optically reads an image of an original (document) placed on a not-shown document plate (platen glass). A printer 613 is connected to the internal bus through a printer interface (I/F) 609. The printer 613 prints and outputs an image formed by the multifunction device 50 to a recording medium.

A CPU 601 controls a print function, a scan function, a copy function, an image processing function, and a communication function by loading, into a RAM 603, a control program stored in a ROM 602 and an application stored in the HDD 611. The HDD 611 is connected to the internal bus through a HDD interface (I/F) 607 and functions as a storage unit for storing applications and various data. Further, the HDD 611 functions as a database for storing data that is produced by processing the image read by the scanner 612 in the document processing system illustrated in FIG. 4. A page memory 604 functions as an area where print data is developed and held when the printer 613 executes image processing.

Figure 10:
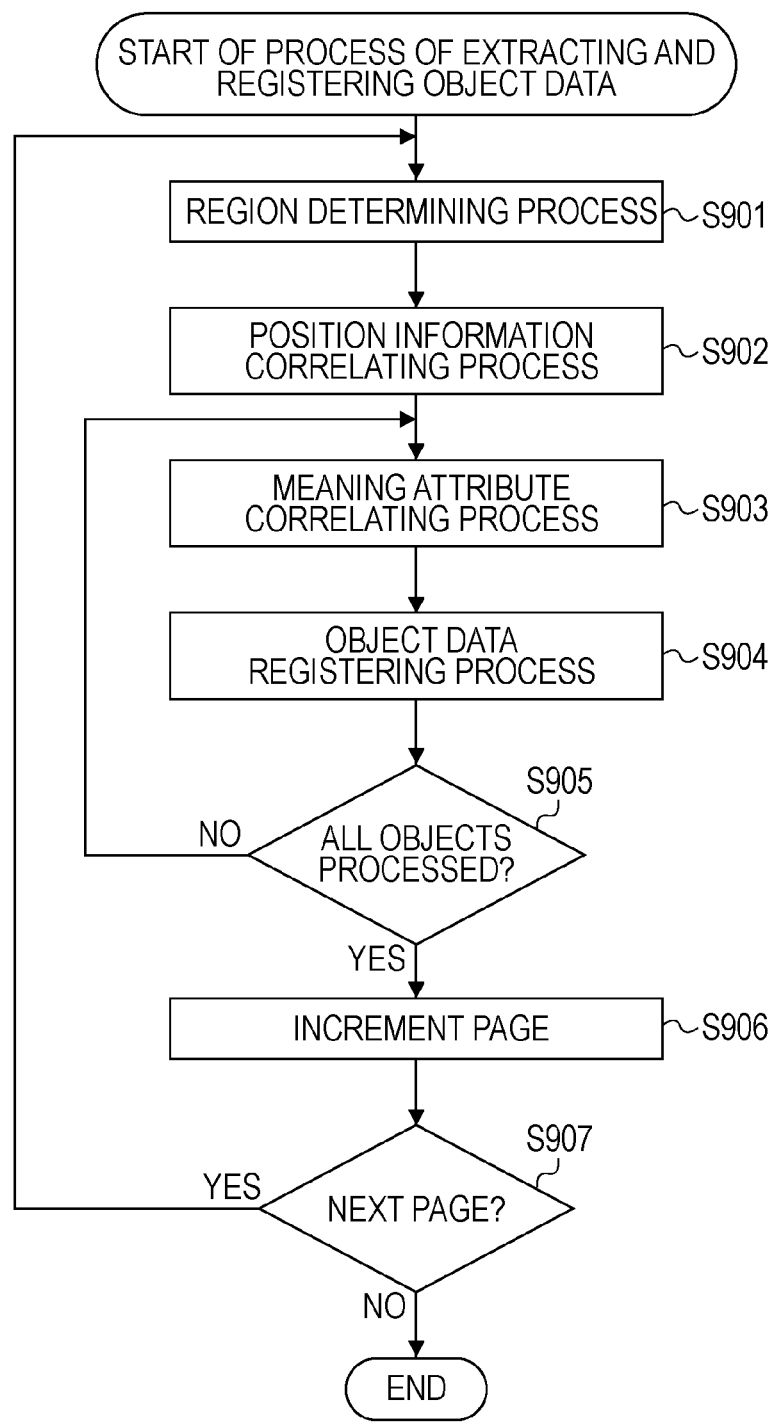
FIG. 10 is a flowchart illustrating an example of a first data processing procedure executed in the document management system according to the exemplary embodiment.

FIG. 10 is a flowchart illustrating an example of a first data processing procedure executed in the document management system according to the exemplary embodiment. This example represents processing in which object data is extracted and stored in the object data storage portion 401. Such processing is executed by the multifunction device 50 equipped with the scanner function. In FIG. 10, S901 to S907 indicate successive steps. Those steps are each realized with the CPU 601 of the multifunction device 50, which loads control program from the ROM 602 and/or the HDD 611 into the RAM 603 and executes the control programs. The control programs include the various modules illustrated in FIG. 4. The example illustrated in FIG. 10 corresponds to a series of processes from scanning of the original OR, instructed by the user A, to registration of object data into the object data storage portion 401, as illustrated in FIG. 7.

In S901, the region determining portion 407, illustrated in FIG. 4, executes a region determining process on the read image data to extract object data. Then, in S902, the position information correlating portion 406 executes a position information correlating process in such a way as described above with reference to FIG. 7. The region determining process and the position information correlating process are each a process executed on an entire page image and are handled in units of page.

In S903, the meaning attribute correlating portion 405 refers to Table I of the meaning attribute map illustrated in FIG. 6A and specifies one of the predefined images, which has a high similarity to the extracted object data. Further, the meaning attribute correlating portion 405 executes a process of correlating the meaning attribute, which is set in correspondence to the specified predefined image, to the extracted object data as the attribute information thereof.

In S904, the object data storage portion 400 executes a process of registering the extracted object data and the attribute information in the object data storage portion 401 in correlated fashion.

The object data registering process is executed in response to an instruction from the main control portion 200 illustrated in FIG. 4. The meaning attribute correlating process and the object data registering process are executed per extracted object data.

In S905, the main control portion 200 determines whether all sets of object data cut out from the relevant page have been completely processed. If the meaning attribute correlating process and the object data registering process are not yet completed for all the sets of object data having been extracted from the entire page image, the processing returns to S903.

On the other hand, if the main control portion 200 determines in S905 that all the sets of object data have been completely processed, it shifts to processing for the next page.

Thus, if both the processes have been completed for all the sets of object data, the processing advances to S906.

In S906, the main control portion 200 executes a page incrementing process. Further, in S907, the main control portion 200 refers to the result of the page incrementing process and determines whether the next page is present. If the main control portion 200 determines that the next page is present, the processing returns to S901.

On the other hand, if the main control portion 200 determines in S907 that the next page is not present, the process of extracting and registering the object data is brought to an end.

As a result, the object data are registered such that, when other users belonging to different departments try to search the object data registered by the user A, various search results can be obtained in forms adapted for the respective departments to which individual users belong.

[Flow in Object Data Search]

Figure 11:
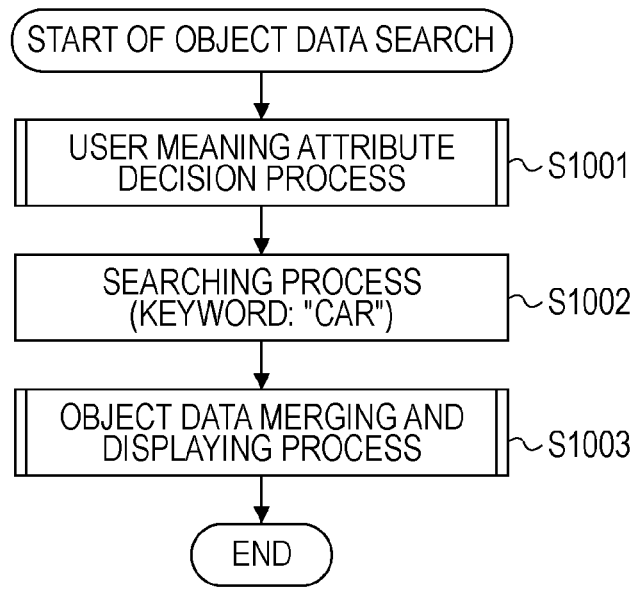
FIG. 11 is a flowchart illustrating an example of a second data processing procedure executed in the document management system according to the exemplary embodiment.

FIG. 11 is a flowchart illustrating an example of a second data processing procedure executed in the document management system according to the exemplary embodiment. This example represents processing executed in a search of object data. In FIG. 11, S1001 to S1003 indicate successive steps. Those steps are each realized with the CPU 601 of the multifunction device 50, which loads control program from the ROM 602 and/or the HDD 611 into the RAM 603 and executes the control programs. The control programs include the various modules illustrated in FIG. 4.

In S1001, the decision processing portion 403 refers to Table II of the user meaning attribute map illustrated in FIG. 6B and executes a process of deciding the user meaning attribute. Then, in S1002, the search processing portion 402 executes a searching process in accordance with a keyword that is input as the search condition by the user. At that time, the user designates a text, e.g., "car", as the keyword. Upon receiving the designation, the search processing portion 402 searches for object data that can be reutilized. Herein, the search processing portion 402 searches for the object data including at least particular information (keyword), e.g., "car", in the attribute information thereof.

In S1003, the merge processing portion 404 executes a process of merging and displaying the object data.

The layout of a screen used in the displaying process is generated by the Web UI generating portion 203 in accordance with an instruction from the main control portion 200.

Details of the process of deciding the user meaning attribute and the process of merging and displaying the object data will be described below.

[Flow of User Meaning Attribute Decision Process]

Figure 12:
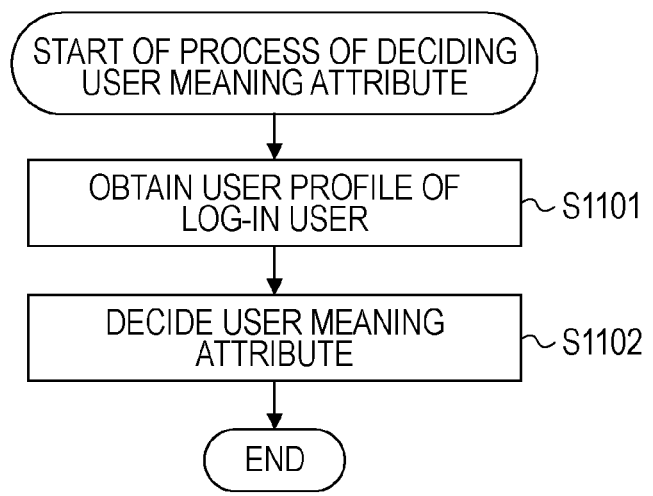
FIG. 12 is a flowchart illustrating an example of a third data processing procedure executed in the document management system according to the exemplary embodiment.

FIG. 12 is a flowchart illustrating an example of a third data processing procedure executed in the document management system according to the exemplary embodiment. This example represents details of the user meaning attribute decision process of step S1001 in FIG. 11. In FIG. 12, S1101 and S1102 indicate successive steps. Those steps are each realized with the CPU 601 of the multifunction device 50, which loads control program from the ROM 602 and/or the HDD 611 into the RAM 603 and executes the control programs. The control programs include various modules illustrated in FIG. 4.

In S1101, the (user meaning attribute) decision processing portion 403 executes a process of obtaining the user characteristic (profile) of a log-in user. Herein, the process of obtaining the user characteristic is started by the (user meaning attribute) decision processing portion 403. In more detail, however, the user information manipulating portion 300 obtains information from the user information storage portion 301 in accordance with an instruction from the main control portion 200.

In S1102, the (user meaning attribute) decision processing portion 403 decides the user meaning attribute, following which the process of deciding the user meaning attribute is brought to an end. More specifically, when, for example, the department to which the user belongs is specified, the user characteristic is definitely confirmed. Then, the user meaning attribute is decided corresponding to the confirmed user characteristic based on Table II of the user meaning attribute map illustrated in FIG. 6B. Thus, features of images to be searched for can be narrowed by referring to the meaning attribute indicated in FIG. 6A. Because the narrowed image features are adapted for the user characteristic, the user can obtain, as the search result, images and texts which are adapted for, e.g., the department to which the user belongs.

[Flow of Object Data Merging and Displaying Process]

Figure 13:
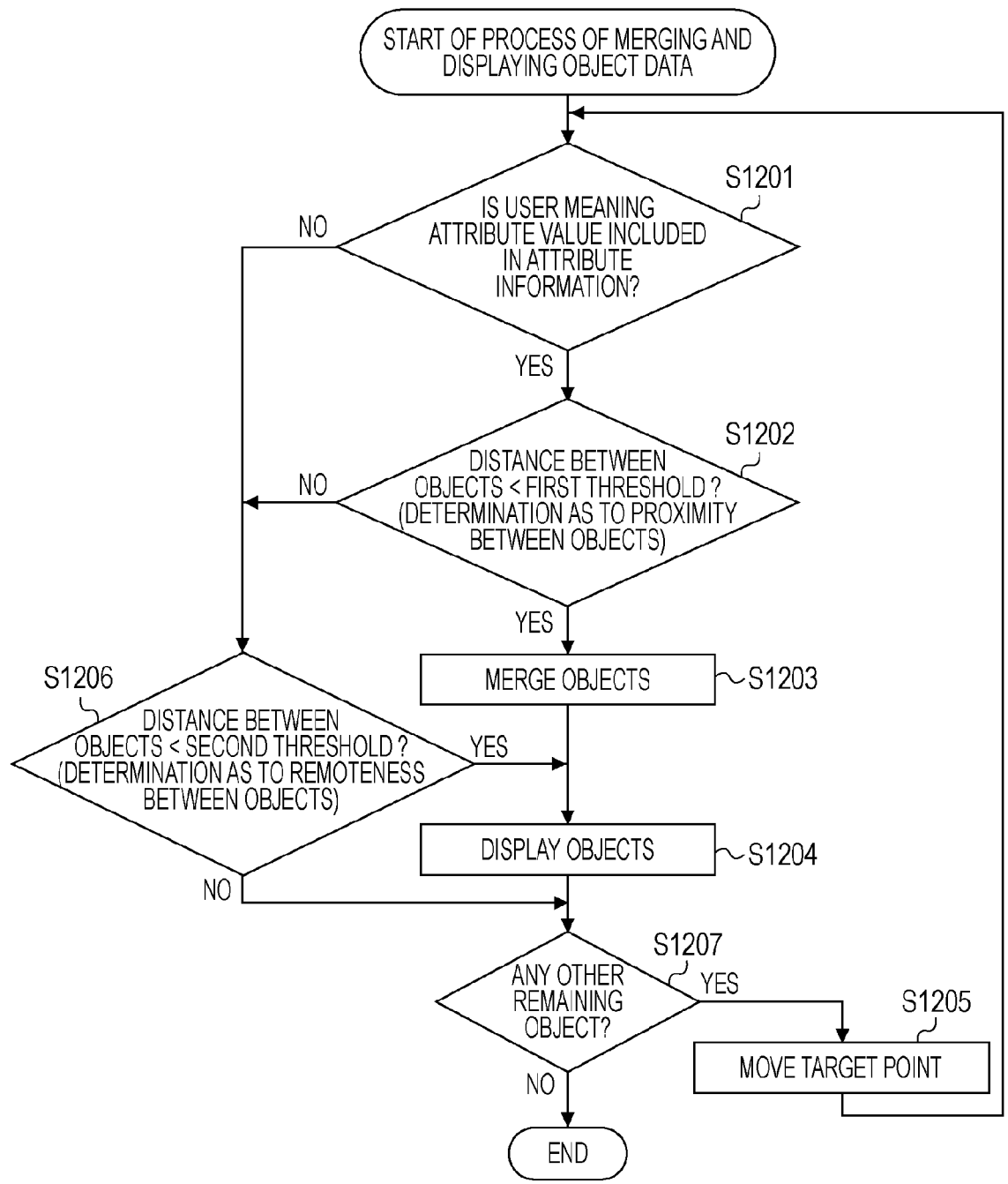
FIG. 13 is a flowchart illustrating an example of a fourth data processing procedure executed in the document management system according to the exemplary embodiment.

FIG. 13 is a flowchart illustrating an example of a fourth data processing procedure executed in the document management system according to the exemplary embodiment. This example represents processing in which the merge processing portion 404 merges and displays plurals sets of object data having been hit as the result of a search. In FIG. 13, S1201 to S1207 indicate successive steps. Those steps are each realized with the CPU 601 of the multifunction device 50, which loads control program from the ROM 602 and/or the HDD 611 into the RAM 603 and executes the control programs. The control programs include various modules illustrated in FIG. 4.

In S1201, the merge processing portion 404 determines whether the user meaning attribute is included in the attribute information of the object data having been hit as the result of a search. Stated another way, the merge processing portion 404 determines whether any of the user meaning attribute values set in Table II of the user meaning attribute map illustrated in FIG. 6B, e.g., values expressed by "parts" and "completed product, nearby text, and specs", is included in the attribute information of the object data having been hit as the result of a search.

The determination result can be made "yes" if any one of the attribute values expressed by "completed product, nearby text, and specs" and so on is included, or if all of the attribute values are included. Such an option can be changed as an external parameter to adjust a degree of merge.

If the merge processing portion 404 determines in S1201 that the attribute value(s) expressed by "completed product, nearby text, and specs" is included in the attribute information, the processing advances to S1202, and if the attribute value(s) is not included in the attribute information, the processing shifts to S1206. Note that the determination in S1201 in this exemplary embodiment is made based on the relationship between the object data as a target and one or more other object data having been hit. The other object data include an object data that has already been merged. In some cases, three or more sets of object data are merged together depending on the results of determinations described below.

In S1202, the merge processing portion 404 determines, based on the position information included in the attribute information, whether the distance between the respective object data is smaller than a predetermined value (first threshold). Stated another way, this step determines the proximity between two objects. The reason is that, according to the experimental rule, objects positioned closer to each other have a higher degree of correlation. The degree of correlation can be adjusted based on the first setting value (threshold) that is input by the user, for example.

If the merge processing portion 404 determines that the distance is short, the processing shifts to S1203, and if the merge processing portion 404 determines that the distance is long, the processing shifts to S1206.

The reason why it is determined in S1202 whether the distance is short or long is as follows. If the distance is short, the merging process (S1203) between the objects can be considered appropriate. On the other hand, if the distance is not smaller than the first threshold in S1202, i.e., if the objects are positioned away from each other, merging those objects together is not appropriate.

In S1206, the merge processing portion 404 determines whether the distance between the target object (data) and the other hit object (data) is smaller than a second threshold. In this determining process, the (object data) merge processing portion 404 determines the remoteness (spacing) between two objects. If the distance is smaller than the second threshold, the merge processing portion 404 processes the relevant hit object data such that it is not to be merged, but to be displayed as one hit object data.

However, if the distance is larger than the second threshold, the merge processing portion 404 processes the relevant hit object data based on such determination that it has been hit in the search, but is not worthy of being displayed. A boundary in determining whether the hit object data is to be displayed as the search result can be adjusted by changing the second threshold.

If the merge processing portion 404 determines in S1206 that the distance between the target object and the other hit object is smaller than the second threshold, the processing advances to S1204.

On the other hand, if the merge processing portion 404 determines in S1206 that the distance between the target object and the other hit object is larger than the second threshold, the processing shifts to S1207.

In S1203, the merge processing portion 404 executes a process of merging the objects together. In this process, the object data including the user meaning attributes and having a short distance between the objects are handled as targets to be merged and displayed. Stated another way, the objects are merged together in this merging process.

The objects are merged based on the coordinate data included in the attribute information of the respective object data. When two objects are apart from each other, those objects are merged together while a space therebetween is complemented (filled) by image data representing a blank.

Even after the objects have been merged together in S1203, the object data before the merging are continuously kept without being discarded. This enables the merged objects to be separated again by a user's operation when the search result is displayed.

In S1204, the merge processing portion 404 executes a process of displaying the objects. While some object data is to be displayed in the merged form and some other object data is to be displayed without being merged, both the object data are displayed as the search result on the same screen.

A view displayed on the screen is generated by the Web UI generating portion 203 in response to an instruction from the main control portion 200 illustrated in FIG. 4. The generated view is transmitted from the data transmitting/receiving portion 201 to the client PC 10 and is displayed through the predetermined browser.

In S1207, the merge processing portion 404 determines whether any object data having been hit in the search still remains other than the target object data. If the merge processing portion 404 determines that there is the remaining object data, the processing shifts to S1205. If the merge processing portion 404 determines that there is no remaining object data, the process of merging and displaying the object data is brought to an end.

In S1205, the main control portion 200 executes a process of moving a target pointer. The target pointer is moved to the object data that has not yet been taken into consideration. In other words, the target pointer is moved to neither the object data that has already been taken into consideration, nor the object data that has already been merged. After the completion of the process of moving the target pointer, the main control portion 200 returns from S1205 to S1201 to repeat the same processing from S1201 as that described above.

The configuration of data processing programs, which are readable by the information processing apparatus according to the exemplary embodiment, will be described below with reference to a memory map of FIG. 14.

FIG. 14 illustrates a memory map in a storage medium storing various data processing programs, which are readable by the information processing apparatus according to the exemplary embodiment.

Though not specifically illustrated in FIG. 14, information for managing a program group stored in the storage medium, such as version information and a writer's name, is also stored in some cases. Further, information depending on an OS (Operating System), etc. on the program reading side, such as icons for displaying the programs in an identifiable manner, is also stored in other cases.

In addition, data belonging to the various programs are managed in a directory illustrated in FIG. 14. A program for installing the various programs in a computer, and a program for, when programs to be installed are compressed, decompressing those programs, can also be stored as well.

The functions of the above-described exemplary embodiment, illustrated in FIGS. 10 to 13, can be executed by a host computer in accordance with programs which are externally installed into the host computer. On that occasion, the present invention is also applicable to the case that an information group, including the programs, is supplied to an output device from a storage medium, such as a CD-ROM, a flash memory or a FD, or from an external storage medium via a network.

Further, practical embodiments of the present invention include the following case. A storage medium recording software program code for realizing the functions of the above-described exemplary embodiments is supplied to a system or an apparatus. Then, a computer (CPU or MPU) incorporated in the system or the apparatus reads and executes the program code stored in the storage medium.

In that case, the program code read out from the storage medium realizes the novel functions of the present invention, and the storage medium storing the program code constitutes a practical embodiment of the present invention.

Therefore, the programs can have various forms, e.g., object code, programs executed by an interpreter, and script data supplied to the OS, so long as the programs have the required functions.

The storage medium for supplying the programs can be, e.g., a flexible disk, a hard disk, an optical disk, a magneto-optical disk (MO), a CD-ROM, a CD-R, a CD-RW, a magnetic tape, a nonvolatile memory card, a ROM, and a DVD.

Thus, the program code read out from the storage medium realizes the functions of the above-described exemplary embodiment, and the storage medium storing the program code constitutes a practical embodiment of the present invention.

Further, the programs can be supplied through the steps of connecting a client computer to a homepage on the Internet through a browser in the client computer, and downloading the computer programs implementing the features of the present invention in themselves or a file, which contains the computer programs in compressed form and which has an automatic installing function, to a recording medium, e.g., a hard disk, from the connected homepage. As another method, program code constituting the programs implementing the features of the present invention can be divided into a plurality of files, and those files can be downloaded from different homepages. In other words, practical embodiments of the present invention include a WWW server and an ftp server for downloading, to a plurality of users, a program file which realizes the functions and the processing executed in the present invention with a computer.

Alternatively, the programs can be supplied as follows. The programs implementing the features of the present invention are encrypted and stored in a storage medium, e.g., a CD-ROM, for distribution to users. The user who clears predetermined conditions is allowed to download key information necessary for decryption from a homepage via the Internet. The user decrypts and executes the encrypted programs by using the downloaded key information, thus installing the programs in a computer.

Practical embodiments of the present invention are not limited to the case that the functions of the above-described exemplary embodiment are realized with a computer executing the read program code. For example, the functions of the above-described exemplary embodiment can also be realized in such a manner that an OS, etc. operating on the computer executes a part or the whole of actual processing in accordance with instructions from the read program code.

The functions of the above-described exemplary embodiment can be further realized as follows. The program code read out from the storage medium is written in a function expansion board inserted in a computer or a memory incorporated in a function expansion unit connected to the computer. Then, a CPU or the like incorporated in the function expansion board or the function expansion unit executes a part or the whole of actual processing in accordance with instructions from the read program code.

The present invention is not limited to the above-described embodiment and can be practiced in various modifications (including organic combinations of embodiments) without departing from the gist of the present invention. Those modifications are not excluded from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-124434 filed May 12, 2008, which is hereby incorporated by reference herein in its entirety.

What is claimed is:

1. An information processing apparatus configured to process document data of a plurality of documents, the information processing apparatus comprising:
    an extracting unit configured to extract a plurality of object data corresponding to each of parts of the document data;
    a storage unit configured to store the plurality of object data extracted by the extracting unit and attribute information of the plurality of object data in relation to each other;
    a searching unit configured to search for first object data correlated to attribute information that matches with a search condition input by a user from the plurality of object data stored by the storage unit;
    a selection unit configured to select, based on a characteristic of the user, second object data from a plurality of other object data extracted from the document data corresponding to the first object data found through the search by the searching unit;
    a merging unit configured to merge the first object data found through the search by the searching unit to the selected second object data based on the characteristic of the user; and
    a control unit configured to control to display, as a search result, merged data into which a plurality of the object data are merged by the merging unit,
    wherein the control unit controls to display different search results when users having different user characteristics input the same search condition.

2. The information processing apparatus according to claim 1, wherein the attribute information of the object data includes one of an image and a text,
    when the attribute information of the object data includes a text, text information obtained by analyzing the relevant object data is set as the attribute information of the relevant object data, and
    when the attribute information of the object data includes an image, attribute information preset for an image, which is similar to an image based on the relevant object data, is set as the attribute information of the relevant object data.

3. The information processing apparatus according to claim 1, wherein the user characteristic is information regarding a role of the user and a department to which the user belongs.

4. The information processing apparatus according to claim 1, wherein the attribute information includes position information of the object data in the document data, the position information being used to compare position relation of the plurality of object data extracted from the document data for a merge process by the merging unit.

5. The information processing apparatus according to claim 1, wherein on condition that a plurality of object data extracted from the document data are found through the search by the searching unit, when a distance derived from the respective position information of two among the plurality of object data is smaller than a first threshold, the merging unit merges those two object data together, and when the distance derived from the respective position information of two among the plurality of object data is not smaller than the first threshold, the merging unit does not merge those two object data.

6. The information processing apparatus according to claim 1, wherein the selected second object data includes object data that is not found through the search by the searching unit according to the input search condition.

7. A method in an information processing apparatus for processing document data of a plurality of documents, the method comprising:
    extracting a plurality of object data corresponding to each of parts of the document data;
    storing the extracted plurality of object data and attribute information of the plurality of object data in relation to each other;
    searching for first object data correlated to attribute information that matches with a search condition input by a user from the stored plurality of object data;
    selecting, based on a characteristic of a user, second object data from a plurality of other object data extracted from the document data corresponding to the first object data found through the search;

merging the first object data found through the search to the selected second object data based on the characteristic of the user; and displaying, as a search result, the merged object data, wherein different search results are displayed when users having different user characteristics input the same search condition.

8. The method according to claim 7, wherein the attribute information of the object data includes one of an image and a text, when the attribute information of the object data includes a text, text information obtained by analyzing the relevant object data is set as the attribute information of the relevant object data, and when the attribute information of the object data includes an image, attribute information preset for an image, which is similar to an image based on the relevant object data, is set as the attribute information of the relevant object data.

9. The method according to claim 7, wherein the user characteristic is information regarding a role of the user and a department to which the user belongs.

10. The method according to claim 7, wherein the attribute information includes position information of the object data in the document data, the position information being used to compare position relation of the plurality of object data extracted from the document data for merge processing.

11. The method according to claim 7, wherein on condition that a plurality of object data extracted from the document data are found through the search, when a distance derived from the respective position information of two among the plurality of object data is smaller than a first threshold, those two object data are merged together, and when the distance derived from the respective position information of two among the plurality of object data is not smaller than the first threshold, those two object data are not merged.

12. The method according to claim 7, wherein the selected second object data includes object data that is not found through the search according to the input search condition.

13. A non-transitory computer readable storage medium on which is stored a computer program for making a computer execute a method for processing document data of a plurality of documents, the method comprising the steps of:

extracting a plurality of object data corresponding to each of parts of the input document data;

storing the extracted plurality of object data and attribute information of the plurality of object data in relation to each other;

searching for first object data correlated to attribute information that matches with a search condition input by a user from the stored plurality of object data;

selecting, based on a characteristic of a user, second object data from a plurality of other object data extracted from the document data corresponding to the first object data found through the search;

merging the first object data found through the search to the second selected object data based on the characteristic of the user; and displaying, as a search result, the merged object data, wherein different search results are displayed when users having different user characteristics input the same search condition.

14. The non-transitory computer readable storage medium according to claim 13, wherein the selected second object data includes object data that is not found through the search according to the input search condition.

15. A method in an information processing apparatus for processing document data of a plurality of documents, the method comprising:

extracting a plurality of object data corresponding to each of parts of the document data;

storing the extracted plurality of object data and attribute information of the plurality of object data in relation to each other;

searching for first object data correlated to attribute information that matches with a search condition from the stored plurality of object data;

selecting, based on a characteristic of a user, second object data from a plurality of other object data extracted from the document data corresponding to the first object data found through the search;

merging the first object data found through the search to the selected second object data based on a merge condition at the time of the search; and displaying, as a search result, the merged object data, wherein different search results are displayed when the merge conditions at the time of the search are different even if the same search condition is input.

16. The method according to claim 15, wherein the selected second object data includes object data that is not found through the search according to the input search condition.

17. A non-transitory computer readable storage medium on which is stored a computer program for making a computer execute a method for processing document data of a plurality of documents, the method comprising the steps of:

extracting a plurality of object data corresponding to each of parts of the document data;

storing the extracted plurality of object data and attribute information of the plurality of object data in relation to each other;

searching for first object data correlated to attribute information that matches with a search condition from the stored plurality of object data;

selecting, based on a characteristic of a user, second object data from a plurality of other object data extracted from the document data corresponding to the first object data found through the search;

merging the first object data found through the search to the selected second object data based on a merge condition at the time of the search; and displaying, as a search result, the merged object data, wherein different search results are displayed when the merge conditions at the time of the search are different even if the same search condition is input.

18. The non-transitory computer readable storage medium according to claim 17, wherein the selected second object data includes object data that is not found through the search according to the input search condition.

* * * * *